(12) United States Patent
Welle et al.

(10) Patent No.: US 10,429,181 B2
(45) Date of Patent: Oct. 1, 2019

(54) MEASURING DEVICE AND METHOD FOR DETECTING THE CHARACTERISTICS OF AN OBJECT

(71) Applicant: VEGA GRIESHABER KG, Wolfach (DE)

(72) Inventors: Roland Welle, Hausach (DE); Levin Dieterle, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 128 days.

(21) Appl. No.: 15/118,122

(22) PCT Filed: Feb. 11, 2014

(86) PCT No.: PCT/EP2014/052650
§ 371 (c)(1),
(2) Date: Aug. 11, 2016

(87) PCT Pub. No.: WO2015/120885
PCT Pub. Date: Aug. 20, 2015

(65) Prior Publication Data
US 2017/0167865 A1    Jun. 15, 2017

(51) Int. Cl.
| G01B 21/20 | (2006.01) |
| G01G 11/00 | (2006.01) |
| H04Q 9/00 | (2006.01) |
| G01B 15/04 | (2006.01) |
| G01F 1/66 | (2006.01) |

(52) U.S. Cl.
CPC ............ G01B 21/20 (2013.01); G01B 15/04 (2013.01); G01F 1/662 (2013.01); G01G 11/003 (2013.01); H04Q 9/00 (2013.01)

(58) Field of Classification Search
CPC ........ G01G 11/003; G01F 1/662; G01B 21/20
See application file for complete search history.

(56) References Cited

U.S. PATENT DOCUMENTS

| 5,448,243 | A | * | 9/1995 | Bethke | .................... | G01S 13/87 |
| | | | | | | 342/29 |
| 5,661,561 | A | | 8/1997 | Wurz et al. | | |
| 5,969,823 | A | | 10/1999 | Wurz et al. | | |
| 6,130,437 | A | | 10/2000 | Cerny et al. | | |

(Continued)

FOREIGN PATENT DOCUMENTS

| DE | 10 2011 011 300 A1 | 8/2011 |
| EP | 2 390 620 A1 | 11/2011 |

(Continued)

OTHER PUBLICATIONS

International Search Report dated Jul. 23, 2014 in PCT/EP2014/052650 Filed Feb. 11, 2014.

(Continued)

*Primary Examiner* — Stephanie E Bloss
(74) *Attorney, Agent, or Firm* — Oblon, McClelland, Maier & Neustadt, L.L.P.

(57) ABSTRACT

A measuring apparatus for detecting properties of an object including an object guidance device of a definable width, a first transmitter and at least two receivers and control circuitry. The control circuitry transmits a transmit signal and receives a receive signal. The control circuitry uses the receive signals to analyze the structure of the object along a linear region inside the width of the object guidance device.

17 Claims, 5 Drawing Sheets

(56) References Cited

U.S. PATENT DOCUMENTS

| | | | |
|---|---|---|---|
| 6,177,999 B1 | 1/2001 | Wurz et al. | |
| 6,392,247 B1 | 5/2002 | Cerny et al. | |
| 9,784,820 B2* | 10/2017 | Arage | G01S 7/41 |
| 2002/0001091 A1* | 1/2002 | Wurz | G01B 11/00 |
| | | | 356/625 |
| 2009/0167607 A1* | 7/2009 | Holder | G01S 13/003 |
| | | | 342/453 |
| 2011/0290989 A1* | 12/2011 | Merettig | G01B 11/028 |
| | | | 250/224 |
| 2012/0299773 A1* | 11/2012 | Stirling-Gallacher | |
| | | | G01S 13/89 |
| | | | 342/368 |
| 2012/0299820 A1* | 11/2012 | Dahl | G06F 3/011 |
| | | | 345/156 |
| 2012/0312663 A1* | 12/2012 | Schmidt | H02J 50/10 |
| | | | 198/788 |
| 2013/0054193 A1* | 2/2013 | Schajer | G01B 21/20 |
| | | | 702/167 |

FOREIGN PATENT DOCUMENTS

| | | |
|---|---|---|
| WO | 96/38708 A1 | 12/1996 |
| WO | WO 2010/003656 A1 | 1/2010 |

OTHER PUBLICATIONS

International Preliminary Report on Patentability and Written Opinion dated Aug. 25, 2016 International Application No. PCT/EP2014/052650.

Office Action dated Oct. 31, 2018, in Chinese Patent Application No. 201480074246.1 (with English-language translation), 17 pages.

Office Action dated Mar. 29, 2019; in Taiwan Patent Application No. 104104614 (w/English-language translation), 12 pgs.

* cited by examiner

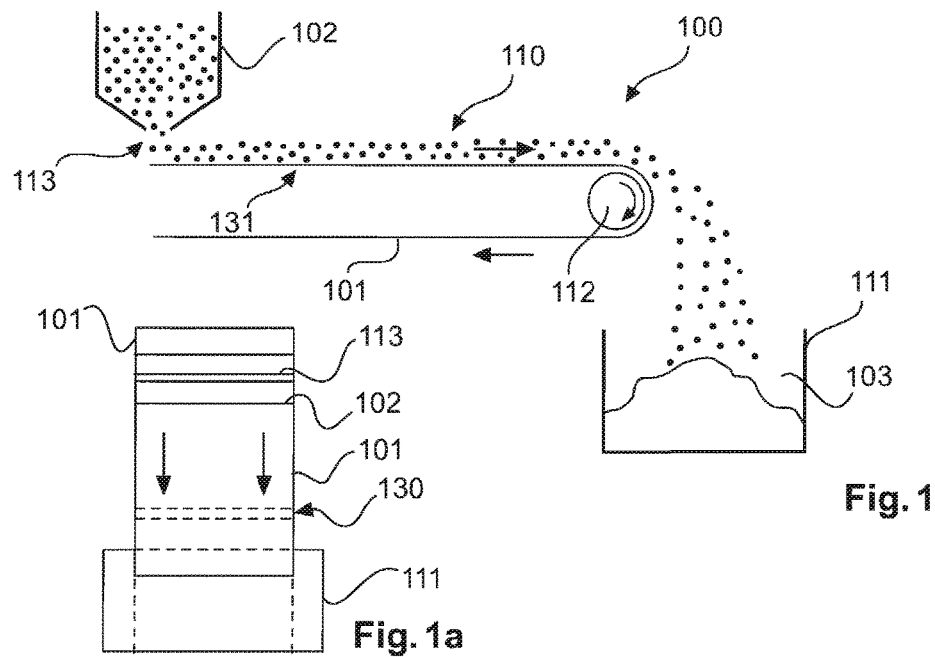
Fig. 1
Fig. 1a
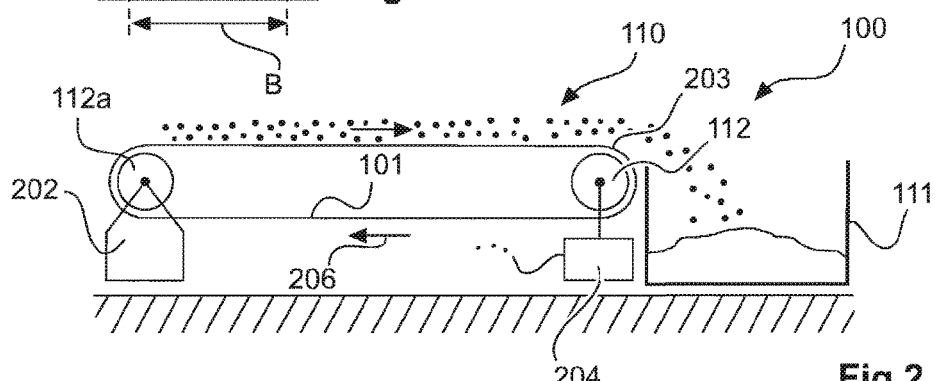
Fig. 2
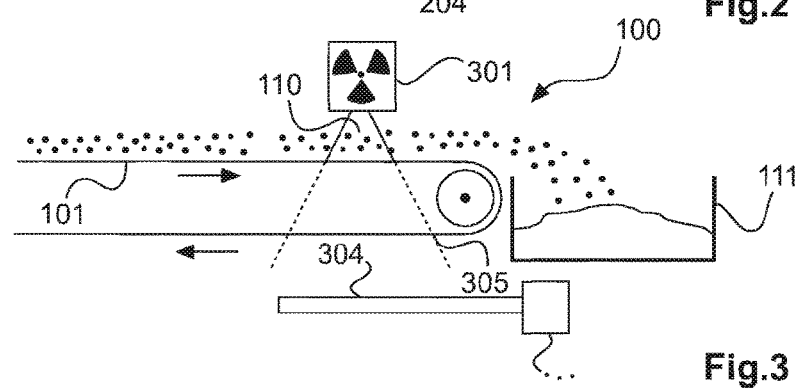
Fig. 3

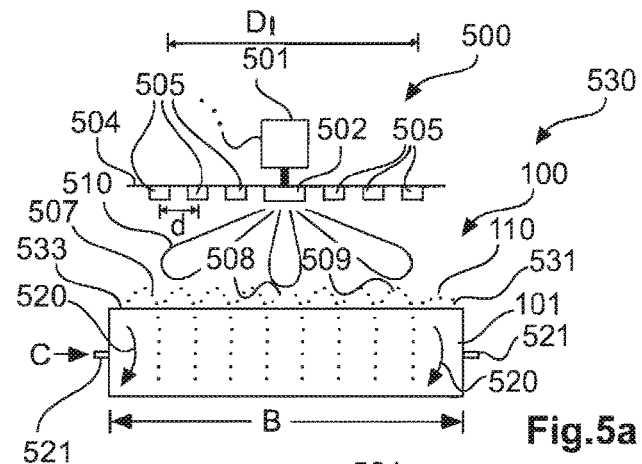
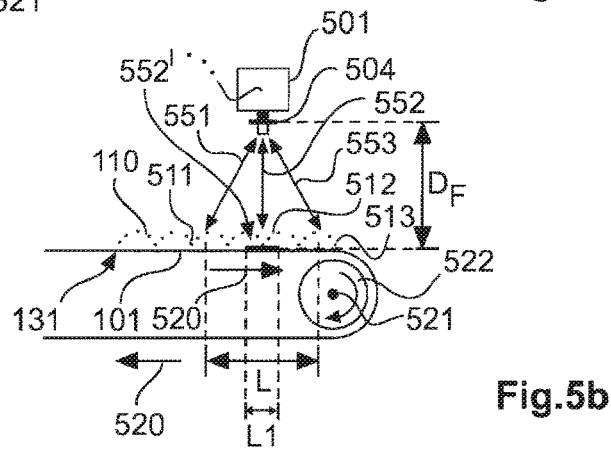
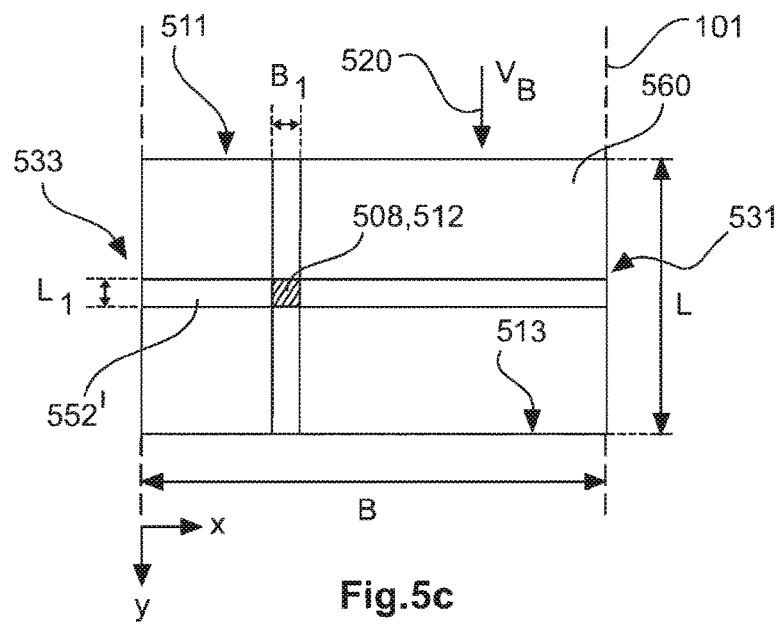

MEASURING DEVICE AND METHOD FOR DETECTING THE CHARACTERISTICS OF AN OBJECT

TECHNICAL FIELD

The present invention relates to the technical field of measurement technology. In particular, the present invention relates to a measuring apparatus for detecting properties of an object, to a method for detecting properties of an object and to a computer program product for detecting properties of an object.

BACKGROUND OF THE INVENTION

When objects are conveyed, it is often required to establish the amount or quantity of the objects that has been moved. The question of the conveyed amount arises for conveyor belts in quarries, in agriculture or in the blast furnace industry and even for conveyor belts used in energy production or in port facilities. In many of these industry sectors, there is a particular requirement during a filling or emptying process to record as a volume or mass, the amount of material moved by means of a conveyor belt, for example in order then to produce automated invoices for example or to stop the filling process at the right time.

Belt scales, which continually detect the force currently exerted by the weight of the conveyor belt and of the conveyed medium, can be used, for example, to determine the conveyed amount of an object.

Using belt scales to monitor conveyor systems, however, can result in operational variations that may falsify the measurement result. In addition, the measuring apparatus for using a belt scale must be incorporated directly in the design of the conveying means, and it is difficult to retrofit to existing installations.

SUMMARY OF THE INVENTION

Hence one aspect of the present invention describes a measuring apparatus for detecting properties of an object, a method for detecting properties of an object and a computer program product for detecting properties of an object.

It may be required to facilitate efficient measurement of the properties of a moved object.

The independent claims define the subject matter of the invention. The dependent claims define further embodiments of the invention.

One aspect of the invention defines a measuring apparatus for detecting properties of an object on an object guidance means. The measuring apparatus comprises a transmitter, at least two receivers and a control device. In one example, a measuring apparatus may be defined having just one transmitter. In another example, at least two transmitters may be available. The control device is designed to transmit a transmit signal using the transmitter. In addition, the control device is designed to receive a receive signal, and in particular at least two receive signals, using the at least two receivers, the receive signals being produced by the same transmit signal. In one example, the at least two receivers may receive the receive signal substantially in parallel or simultaneously. When receiving, the receivers may receive the receive signal with a phase offset, because the receivers may be arranged at different positions. The phase offset may be defined by the position of the receivers or of the receive units. The receive signal may be the transmit signal resulting substantially from reflections at the object and/or at the object guidance means. In particular, the receive signal may result from a reflection at the object surface.

The control device is designed to use the receive signals from the at least two receivers to analyse the structure or topology of the object along a linear region inside a width of the object guidance means. Delimiting to a definable width may ensure that all the parts belonging to the object are detected by the at least two receivers. In one example, the width inside which the analysis is meant to take place may be adjustable at the control device, for example by adjusting a corresponding parameter.

The analysis can produce a height profile of the object along the linear region above a reference plane. This height profile can be provided. The volume under the height profile can be obtained from this height profile. The volume obtained can be provided.

The measuring apparatus can be fitted so that it is fixed with respect to the object guidance means. The measuring apparatus may have a retaining apparatus for this purpose.

Delimiting the object guidance means to a definable width may also allow the width and/or length of the linear region to be delimited, with the result that the transmit signal and/or receive signal need be considered essentially only within the delimited region. Thus, for example, a transmit beam direction of the transmit signal and/or a receive direction of the receive signal can be focused onto the width and/or length of the linear region. In other words, it may be possible to define an angle range for the beam directions of the transmit signal and/or of the receive signal in order to achieve delimiting to a linear region. A linear region may have a length that is greater than the width of the linear region. The length of the linear region may be substantially equal to the width of the object guidance means. In one example, the linear region may be rectangular or oval in shape. The linear region may be substantially a footprint of the transmit signal and/or of the receive signal or part of a footprint.

In other words, owing to the antenna radiation pattern, the transmit signal may capture a region of the surface of the object that is larger than the linear region of interest. This antenna radiation pattern and hence the exposed region can be defined by physical beamforming of the transmit signal, for example by means of a physical focusing device and/or by beamforming of the transmit signal, i.e. by changing the phase shift between the transmitters. The exposed region may comprise the region captured by the transmitted transmit signal and may also be referred to as the examined region.

By subsequent digital processing of the receive signals by the receivers, for instance by digital beamforming, the reflected signal can generate or extract the required linear region from the exposed region and/or partition the linear region into square or circular sample areas in order thereby to determine the volume under the sample areas and sum same to give a total volume of the linear region. Integral calculus methods can be used in the calculation of the total volume of the linear region by making the sample areas small and thereby increasing the number of sample areas along the linear region. The linear region may also be referred to as a time slice, which may mean that a linear region may comprise the structure detected in a measurement process.

In one example, instead of one single transmitter and at least two receivers, there are at least two transceivers. A transceiver may be provided for transmitting and receiving a signal using a single device. By a switchover in the control device, the transceiver can be operated such that a signal is transmitted via the transceiver, and a reflected signal is received by the transceiver. The status in which the signal is transmitted may be referred to as the transmit mode, and the status in which the signal is received may be referred to as the receive mode. It is possible, for example, to use the at least two transceivers to generate in the transmit direction a transmit signal that is incident on a large area, and to use the at least two transceivers to perform beamforming of the receive beam, allowing focusing and/or partitioning of a linear region. For the purpose of beamforming of the transmit signal and/or the receive signal, at least two transmitters or at least two receivers may be provided that are coupled to one another, thereby forming an antenna array.

Another aspect of the present invention may describe a method for detecting properties of an object on an object guidance means. One property of the object may be its surface structure and/or its surface topology. The method may provide transmitting a transmit signal by means of a transmitter and receiving a receive signal by means of at least two receivers, the receive signals being produced by the same transmit signal. In one example, the receive signals may be received substantially simultaneously. In this context, simultaneously may mean that the receive signals are received mainly in a time window, which can be interpreted as a simultaneity interval. The term "simultaneous", "parallel" or "at the same time" may be taken to mean that the receive signals are produced by the same transmit signal. When received at different receivers, the reflection of the same transmit signal can arrive at different times within the time window because of the different spatial arrangement of the receivers.

Transmitting and receiving, for example, take place in the same plane at a definable distance from an object guidance means. In other words, the object guidance means may be arranged in a signal propagation direction opposite the plane in which the transmitter and/or the at least two receivers are located. Provided the position of the transmitter and/or the receiver with respect to each other is known, then any arrangement of the transmitter and/or of the at least two receivers may be possible.

By limiting a movement of the object to a region inside a definable width, it may be guaranteed that all the elements of the object that are meant to be detected can actually be detected. The antenna radiation pattern of the transmit signal can be adapted to the delimitation of the object guidance means. The antenna radiation pattern may be a radiation pattern of an isotropic radiator when using a single transmitter. An array, however, can also use beamforming to produce any radiation pattern if at least two transmitters are used in the array. Beamforming can also be achieved by a physical beamforming device or focusing device such as a parabolic trough for example.

After the receive signal(s) have been received, the structure of the object can be analysed using the receive signal and/or the receive signals captured by the at least two receivers along a linear region inside the width of the object guidance means. The shaping of the linear region may be performed by mathematical operations during signal post-processing, for example in the control device or in an analysis device. In one example, the linear region inside the width of the object guidance means may be a footprint or a projection, which is generated by the transmitter and/or by the at least two receivers.

Yet another aspect of the present invention defines a computer program product that is designed to perform the method according to the invention when executed by a processor.

Yet another aspect of the present invention defines a computer-readable data storage medium on which is stored a program code that performs the method according to the invention for detecting properties of an object when executed by a processor.

A computer-readable storage medium may be a floppy disk, a hard drive, a DVD (Digital Versatile Disc), a Blu-Ray Disc™, a USB (Universal Serial Bus) storage medium, a RAM (Random Access Memory), a ROM (Read Only Memory) or an EPROM (Erasable Programmable Read Only Memory). A communications network such as the Internet, which may allow the upload or download of program code, may also be considered a computer-readable storage medium.

The measuring apparatus may be a field device or a sensor. The sensor may comprise the transmitter, the at least two receivers and/or the control device. In one example, the measuring apparatus may also comprise the object guidance means, which has a definable width. The sensor may be adapted to the geometric dimensions of the object guidance means, in particular to the width of the object guidance means. In particular, the size of the sensor may be adapted to the geometric size of the object guidance means. In one example, however, the sensor may also be smaller than the width of the object guidance means, and may capture a larger region by controlling the receive directions. The field device may be embodied as a level-measuring instrument, a volume-measuring instrument and/or as a flow-measuring instrument, and can be adapted to an existing object guidance means. In one example, the measuring apparatus can be combined with a level-measuring instrument, and a level measurement can be used to perform a plausibility check of the conveyed volume.

For adaptation to the object guidance means, the field device and/or the measuring apparatus may comprise a focusing device, which can be used to define in the direction of movement of the object the width of the linear region that can be detected. Independently thereof, the field device and/or the measuring apparatus can comprise a beamforming device, which can be used to adjust the length of the linear region in a lateral direction and/or can be used to partition the region into small sample areas.

The object guidance means may be designed to limit a movement of the object to a region inside the definable width. Hence the definable width of the object guidance means can be adjusted in the control device in order to confine the receive region of the receive beams, i.e. to confine the receive directions, to the width of the object guidance means or to match said receive region to the width. In one example, the object guidance means may define both the direction of movement and the region inside which the object can move. In another example, the object may move itself and define the direction of movement. The object guidance means may be designed essentially to ensure that the object moves inside the region of the definable width in order that the linear region of interest can be located within limits. For the purpose of confining the movement, the object guidance means may comprise, for instance, a fence, a guard rail or a barrier, or may even have an edge that slopes in the direction of gravity so that elements of the object lying outside the width would drop to the ground.

In one example, the object guidance means may work independently of the measuring apparatus.

The focusing device may be designed as a physical focusing device, for instance as a parabolic trough, as an antenna array, dielectric cylindrical lens or comparable focusing device. In addition, it may be possible to use an SAR (Synthetic Aperture Radar) algorithm to analyse the captured measurement data for the purpose of mathematical focusing along the direction of movement of the conveyor and/or along the direction of movement of the object. If physical focusing is performed along the direction of movement, the SAR analysis can be dispensed with. An array is not needed for the SAR analysis because it may analyse solely Doppler data. An array is formed from at least two receivers and/or from at least one transmitter, for which the spatial position with respect to one another is known and which are each connected to one another. The at least one transmitter may be a single transmitter or at least two transmitters. The spatial position with respect to one another can be used to determine a phase shift between the transmit signals and/or receive signals. The receivers and/or transmitters may be arranged in any manner in the array. For the analysis, in particular for the beamforming of the receive signal, the position of the receivers and/or transmitters with respect to one another should be known. The arrangement of the at least two receivers as a linear array may allow beamforming in the lateral direction.

The subject matter described may be used to sample a linear region of the object guidance means and to create therefrom a topology of the surface of the object being guided past the sensor. In this case, the linear region may be essentially a time slice of the topology, the entire topology being obtained by combining a plurality of time slices. The topology may be determined essentially from the distance of the surface of the object from the sensor. The topology may define a height above a reference surface of the object guidance means. The reference surface may be a surface on which the object is lying, for instance the belt of a conveyor belt. If the position of the reference surface is known, i.e. if the distance of the reference surface from the sensor is known, it is possible to determine the absolute height of the object or the height of the topology of the surface of the object. The area under the topology and/or the volume under the topology can be calculated in this manner. If the density of the object is known, then the weight of the volume can also be calculated. If the object is moving, the volume moved per unit of time can be determined, and hence it is possible to infer the level in a container. For example, integration calculus can be used to determine the volume moved per unit of time. This calculation can take into account the speed of movement of the object. It may also be possible to control the speed of movement of the object by means of the control device such that a good integration result can be obtained. The reference surface can also be defined to suit.

The measuring apparatus may comprise an input device, which can be used to input parameters such as, for example, the density of the object, for instance the density of a bulk solid. It may also be possible to enter a grid size, which defines the spacing between two sample points in the lateral direction and/or in the direction of movement of the object.

A measuring apparatus for detecting properties of an object may hence allow the detection of a volume and/or mass being moved in an automated manner in industrial environments from a source to a destination in an object guidance means or by a conveying means, for instance by a conveyor belt. In the context of the present document, not just a conveyor belt may be considered as an object guidance means or conveying means but also any other implementation which is suitable for moving an object from a source to a destination along a reference plane. The measuring apparatus may also be suitable for objects that move themselves on a reference plane inside the object guidance means.

The object may be a bulk solid that has a random surface structure composed of peaks and troughs. The surface structure may be undulated. If a conveying means is not occupied by a bulk solid but by individual objects, the measuring apparatus can be used to detect or count these objects and/or determine the dimensions thereof. The measuring apparatus may be used, for example, in factory automation or even in logistics, e.g. in mail distribution centres or in airports.

Since an object guidance means can be understood to mean any form of conveying means that is suitable for moving masses or objects from a source to a destination, the measuring apparatus can also be used in the context of traffic monitoring, e.g. for classifying and counting vehicles both on the roads and on the railways and seaways. In general, the measuring apparatus can be used to monitor a definable region.

The object guidance means may be used to delimit the region in which an object can move. When a conveyor belt is used, the sides of the conveyor belt define the delimitation because objects extending beyond the sides of the conveyor belt cannot be conveyed. In particular in the case of objects that move themselves, such as people or cars, the delimited region, inside which the objects can spread out and move along, may be defined by barriers or guard rails.

Delimiting may allow monitoring to be reduced to a confined region, which is surveyed or sampled by means of the transmit signal and/or receive signal. Essentially, this region may be a straight line of limited length, which is examined or sampled by means of the transmit signal and/or receive signal. Physical effects, however, mean that it may not always be possible to capture the linear region accurately, which is why the received signal is processed using algorithms. The control device may be designed to identify the boundaries of the linear region and to measure the object inside the region.

The transmitted transmit signal may be a radar signal. This radar signal can be transmitted continuously, in pulsed form or as an FMCW radar signal (Frequency Modulated Continuous Wave radar). In order to capture in the direction of movement a time slice that is as narrow as possible, the transmit signal and/or the receive signal can be directed onto the linear region by physical beamforming using lenses or mirrors, as is done by a parabolic antenna for instance, or else by digital beamforming. The surface structure of the object may hence be scanned in narrow slices. By analysing the reflections coming from the object it is possible to determine the object structure of the object moving through the linear delimited region at the moment of the reflection. In the digital beamforming process, the beamforming is achieved by using mathematical algorithms or mathematical techniques, for instance during analysis of the receive signal, i.e. during postprocessing of the receive signal.

The object may be a rigid body or a bulk solid. For a bulk solid, mainly random accumulations of the elements of the object occur, which arise in a process chain, for instance, as a result of cones, agglomerations, clumping or caking of the elements of the bulk solid caused by raised temperatures. Agglomerations can be produced by existing residual moisture or chemical reaction. These accumulations may create a topology of the object, i.e. the object to be detected may have a corresponding topology. Analysing the cause of the accumulation can afford a prediction of the position or structure of the surface and be incorporated in the calculation of the volume.

Essentially, the profile of the topology of the object at a specific point in time may be determined by linear sampling using the transmit signal and receive signal. By means of this sampling or scanning, it may be possible to determine along the line a height profile of the object at the measurement time. If the reference height or reference plane is known, i.e. if the position of the planes on which the object is located is known, it may be possible to determine the volume of the object at the measurement time and hence the amount or mass of the object. If the density of the object is also known, the weight of the object at the measurement time can be determined. If these measurements are repeated at regular intervals within a time period, the amount of the object moved within this time period can be determined.

According to another aspect of the present invention, the transmitter and the at least two receivers are arranged in the same plane at a definable distance from the object guidance means. In one example, the plane on which the transmitter and the at least two receivers are arranged may be arranged at right angles to the object guidance means. In another example, the plane of the transmitter and of the receiver may lie parallel to a plane of the object guidance means on which the object is conveyed, and/or parallel to a surface formed by a marker device.

In one example, the measuring apparatus comprises at least one second transmitter. The at least one second transmitter is arranged in the same plane as the first transmitter.

According to yet another aspect of the invention, the transmitter and the receivers, or the transmitters and the receivers, may be arranged in a line.

Owing to the finite extent of the transmitters and/or receivers, they may lie in a plane but be arranged in a line in this plane.

The linear alignment both of the transmitters and of the receiver may allow focusing of the transmit signal and/or receive signal along the linear extent of the antenna at right angles to the direction of movement of the object. The direction running substantially at right angles to the direction of movement of the object may be referred to as the lateral direction. Any form of arrangement may be possible besides the linear arrangement of the at least two receivers and/or of the transmitters. For example, the at least two receivers may be arranged in a semicircle. It may be necessary, however, to know the position of the individual receivers with respect to one another in order to be able to take the position into account in the analysis of the receive signals. The linear arrangement of the at least two receivers, however, may reduce the computing steps necessary for analysing a linear region.

In one example, the receivers may be arranged symmetrically about the transmitter(s).

In another example, the transmitter may be arranged at the centroid of the line, and the receivers may be arranged in the direction of the limits of the line. It may be possible to achieve beamforming in the lateral direction, i.e. at right angles to a direction of movement of an object, by means of such an arrangement. The transmitters can be arranged equidistant from one another in a central region. The receivers can also be arranged equidistant from one another. In order to limit the unambiguous measurement range to an angle of 90°, in one example the spacing of the receivers from one another may be less than half the wavelength of the radar signal used. An unambiguous measurement range may define here a range in which the calculated receive signal can be uniquely assigned to an angle, i.e. no ambiguities arise.

In another example, however, receive elements may also be arranged statistically along the extent of the line without having a specific local relationship between one another. Nevertheless, the spacing of the receive elements from one another should be known in order to allow determination of the topology.

According to another aspect of the present invention, the measuring apparatus comprises an object guidance means. The object guidance means is designed to restrict a movement of the object to the region inside the width (B).

The measuring apparatus can be adapted to the dimensions of the object guidance means by combining the measuring apparatus with the object guidance means. It may hence be possible to set the reception angle range to a fixed value in the measuring apparatus and to capture a definable linear region inside the width of the object guidance means. A measuring system whose components are matched to one another can hence be created.

According to another aspect of the present invention, the at least two receivers and the transmitter(s) are arranged inside a region of the width of the object guidance means.

The width across which the transmitters and/or the receivers are arranged may be adapted to the width of the object guidance means. It may hence be possible for the transmitter and/or the receiver to detect effectively the width of the object guidance means. The width of the linear region can additionally be adapted by adjusting the angle of the main beam direction and/or of the receive direction. The width across which the transmitters and/or the receivers are arranged can be equal in size to the width of the object guidance unit. The width across which the transmitters and/or the receivers are arranged can also be less than or greater than the width of the object guidance unit. The transmitter and/or the at least two receivers may form a linear array. In one example, the width of this linear array may equal the width of the object guidance means. In another example, the width of the linear array may be less than or greater than the width of the object guidance means. The width of the linear array equals 20 cm in one example.

According to yet another aspect of the present invention, the object guidance means comprises a marker for defining a reference plane.

Vibrations may cause movement of the object guidance means. This could cause errors in the measurement result for the object topology because, for instance, it is not the height of the object that is changing but the position of the object guidance means. If the object guidance means comprises a marker or marker device, however, which indicates the instantaneous position of the object guidance means with respect to the transmitter and/or to the receivers at the measurement time, the ascertained structure can be corrected. Such a correction can be performed in the control device.

The measuring apparatus may be designed to detect the marker and to use the position of the marker to remove distorting mechanical effects from the measurement result. The measuring apparatus may comprise a marker detection device for detecting the marker.

According to another aspect of the present invention, the measuring apparatus is designed to change the main beam direction of the transmitters and/or the main receive direction of the receivers.

Changing the main beam direction and/or the main receive direction may be used for detecting the signals along the linear region and hence for detecting the structure or topology of the surface in the corresponding region. By using different main receive directions it is possible to extract from the linear region small sample areas for which the relevant height and associated volume is determined. In particular, it may be possible to define an angle range into which the linear region can be subdivided. The main beam directions may be analysed in the postprocessing stage. In particular, changing the main receive direction may allow the targeted analysis of a segment of the linear region.

According to yet another aspect of the present invention, a digital beamforming method is used to change the main receive direction of the receiver. In particular, changing the main receive direction is used to analyse the linear region in the lateral direction. For example, the lateral region can be partitioned into small sample areas, the dimensions of which correspond to the angles of the receive directions.

In addition to analysing in the lateral direction, it is possible to perform focusing in the direction of movement. Focusing may be used for delimiting to a narrowest possible region in the direction of movement. A physical focusing device and/or a mathematical calculation method can be used for focusing. An SAR algorithm (Synthetic Aperture Radar algorithm) can be used, for example, as the calculation method for focusing. Additionally or alternatively, a lens or antenna, for instance a parabolic trough, can be used as the physical focusing device.

In other words, the linear region may be narrowed in the direction of movement by the focusing device, and the narrowed region can be examined in the lateral direction, i.e. at right angles to the direction of movement, by changing the main beam direction and/or the main receive direction. By changing the main receive direction it may be possible to limit substantially the extent of the width, i.e. to define the length of the linear region. By changing the main receive direction it may be possible to examine different segments of the linear region, which are associated with the corresponding angles. It may also be possible by changing the main receive direction to limit the length of the linear region to the width of the object guidance means and/or of a suitably associated marker device. By focusing it is possible to measure as narrow a region as possible of the surface structure of the object and to generate a narrow time slice. By providing small angle ranges for the main receive direction it is possible to reduce further the size of the sample area.

Hence mathematical and/or physical beamforming may be applied as required.

According to yet another aspect of the present invention, the object guidance means may be a mechanism selected from the group of mechanisms that consists of a conveyor belt, a vibrating unit and a roadway.

All these mechanisms can be used for movement of the object in a specified direction and for spatially confining the object during the movement. Likewise, these object guidance means each have a reference plane on which the object moves.

According to another aspect of the present invention, the measuring apparatus also comprises a speed measuring apparatus, wherein the speed measuring apparatus is designed to determine a speed of movement of the object.

If the speed of movement of the object is known, it may be possible to determine a moved volume or moved weight of the object within a time interval. The speed measuring apparatus may be in the form of a rotary encoder and/or a speed radar. It may also be possible to control the speed of movement of the object.

According to another aspect, the moved object is a bulk solid, a vehicle and/or a person.

According to yet another aspect of the present invention, the control device is designed to determine the topology of the object and to determine the volume and/or mass of the object from the topology.

It may be possible to determine the topology without using a weighing scale.

Installation in bearing points of an object guidance means can hence be avoided. Hence it may be possible to easily retrofit a measuring apparatus that uses determining the topology of the object.

According to another aspect of the present invention, the measuring apparatus is designed as a two-wire system.

The two-wire system may use a 4-20 mA signal. A two-wire system may draw the power it needs to operate the measuring apparatus, in particular the power it needs to operate the control device, the sensor, the array, the transmitter and/or the receiver, solely via a two-wire connection. In addition, the two-wire line may be designed for communication, in particular for the output of at least one measured value or a measured value derived therefrom, such as e.g. the topology curve, the mass in the container or the moved volume. The two-wire line may allow bidirectional communication and simultaneously provide the power supply for the measuring apparatus, in particular for the active components of the measuring apparatus.

By implementing the measuring apparatus as a two-wire system, the power can be supplied over the same physical lines used to provide measurement results. A protocol based on the HART® standard or a 4-20 mA signal can be used for data transmission. The measuring apparatus may comprise a measuring instrument interface selected from the group of measuring instrument interfaces that consists of an I²C interface, an HART® interface and a 4-20 mA interface or a 4 to 20 mA interface.

The HART® protocol (Highway Addressable Remote Transducer protocol), which uses an HART® interface, can be referred to in particular as an open master/slave protocol for bus-addressable field devices. It can implement a method to transmit data by means of frequency shift keying (FSK) applied to the 4 to 20 mA process signal in order to allow remote configuration and diagnostic testing. The HART® protocol or a corresponding HART® interface can also be used to transmit raw data. The 4 to 20 mA interface or the HART® interface is a hardware interface, where the 4 to 20 mA interface is an analogue interface, which is capable of transmitting digital data by using the HART® protocol and the physical components or hardware thereof.

Either a processed measured value in the form of the weight per unit of time or the volume per unit of time, or a curve representing the structure of the surface of the object or the topology of the object, can be provided at the measuring instrument interface. This topology curve or surface curve may represent a height profile along the linear region. The topology curve may be determined in the lateral direction using transit time measurements at different points along the linear region or at different angles along the linear region. A transit time measurement may be performed, for example, by measuring a time of flight of a radar wave from the transmit time to the receive time. In one example, the height profiles of the topology curve may be determined by analysing at different angles the echo curves for each of the receivers or each of the receive units. The topology curve itself, however, may not be an echo curve. The analysis can be performed directly at the measuring apparatus. It may also be possible, however, to transfer the analysis to an external analysis device, which is provided only with the raw data. Transferring to an external device may reduce the power consumption of the measuring apparatus, which allows good energy management particularly for two-wire systems.

The transmitter and/or the at least two receivers may be part of a sensor that provides the received signals in the form of an echo curve. The topology curve may be determined from these received signals. The sensor may in turn be part of a field device or may itself be referred to as a field device. The measuring apparatus may comprise the field device or the sensor and an analysis device. The analysis device may be implemented as an external device, which communicates with the field device and/or with the measuring apparatus via one of the measuring instrument interfaces, for example via a two-wire interface, a control loop or a two-wire line. In another example, the analysis device may be integrated in the field device. For example, the analysis device may be designed to screw onto the field device and provide the measured value directly to the measuring apparatus, for instance provide the volume or the weight per unit of time or suitably accumulated values. In addition, a calculated measured value can be received and displayed.

It should be pointed out that different aspects of the invention have been described with reference to different objects. In particular, some aspects have been described with respect to device claims whereas other aspects have been described with reference to method claims. It is clear to a person skilled in the art, however, from the description above and below that, unless specified otherwise, in addition to any combination of features belonging to one category of subject matter, also any combination of features relating to different categories of subject matter can also be considered disclosed by the text. In particular, a combination of features from device claims and features from method claims shall also be deemed disclosed.

SHORT DESCRIPTION OF THE DRAWINGS

Further embodiments of the present invention are described below with reference to the drawings.

FIG. 1 shows a conveying means, to give a better understanding of the present invention.

FIG. 1*a* is a plan view of the conveying means of FIG. 1, intended to give a better understanding of the present invention.

FIG. 2 shows a conveying means having an integrated belt scale, to give a better understanding of the invention.

FIG. 3 shows a conveying means having a radiometric sensor, to give a better understanding of the invention.

Figure 4A:
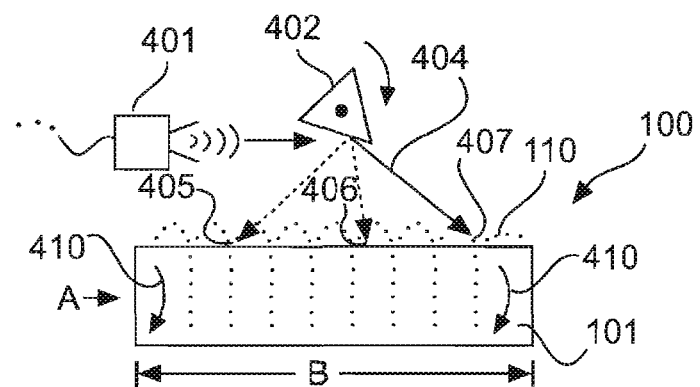

FIG. 4*a* is a front view of a conveying means having a sensor for determining a surface structure of an object by means of laser radiation, intended to give a better understanding of the present invention.

Figure 4B:
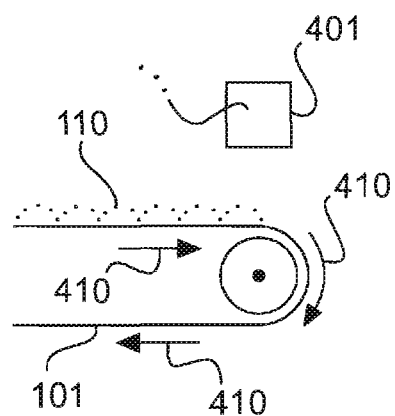

FIG. 4*b* is a side view of a conveying means having a sensor for determining a surface structure of an object by means of laser radiation, intended to give a better understanding of the present invention.

FIG. 5*a* is a front view of a conveying means having a sensor for determining a surface structure of an object by means of radar beams according to an embodiment of the present invention.

FIG. 5*b* is a side view of a conveying means having a sensor for determining a surface structure of an object by means of radar beams according to an embodiment of the present invention.

FIG. 5*c* is a detail of a plan view of a conveying means as shown in FIG. 5*a*, 5*b* according to an embodiment of the present invention.

Figure 6A:
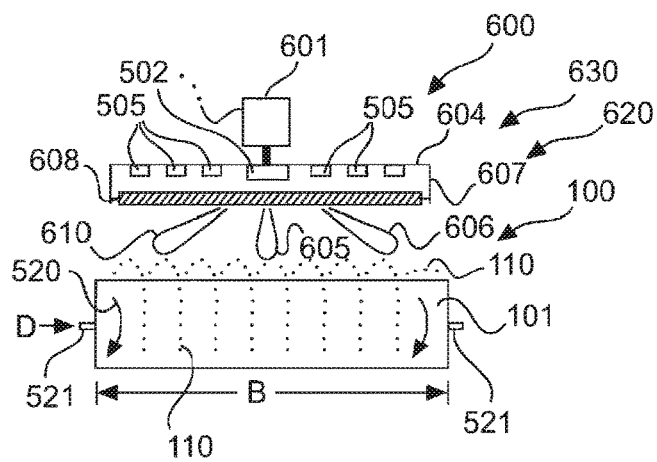

FIG. 6*a* is a front view of a conveying means having a further sensor for determining a surface structure of an object by means of radar beams according to an embodiment of the present invention.

Figure 6B:
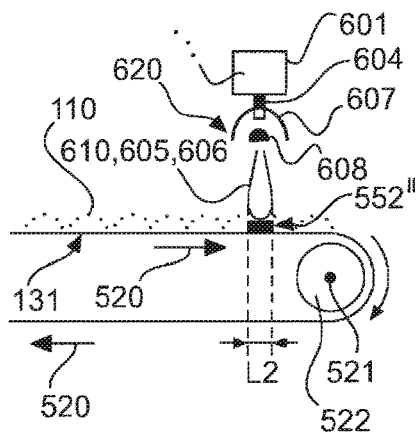

FIG. 6*b* is a side view of a conveying means having a further sensor for determining a surface structure of an object by means of radar beams according to an embodiment of the present invention.

Figure 6C:
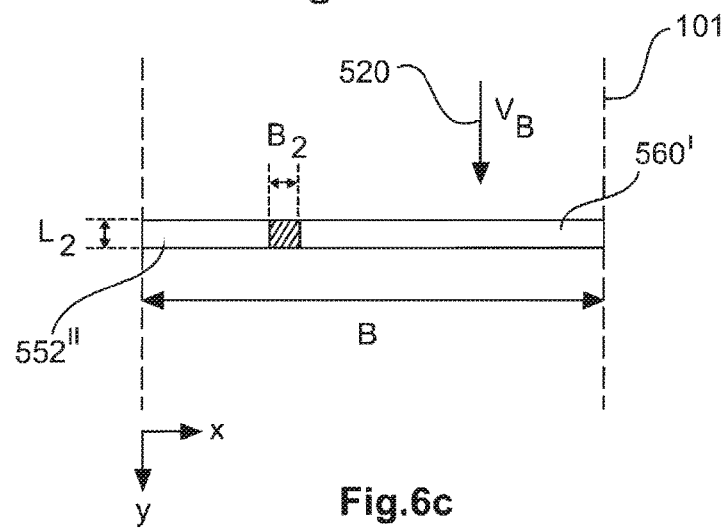

FIG. 6*c* is a detail of a plan view of a conveying means as shown in FIG. 6*a*, 6*b* according to another embodiment of the present invention.

Figure 7:
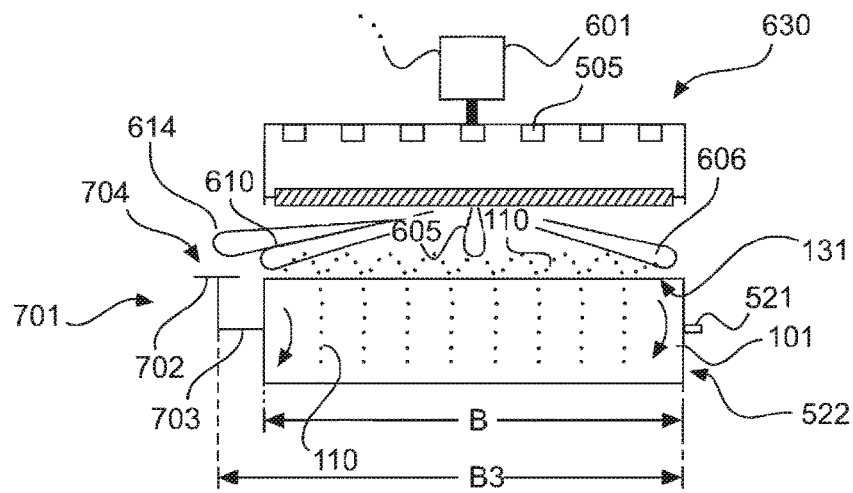

FIG. 7 shows a measuring apparatus having a marker according to an embodiment of the present invention.

Figure 8:
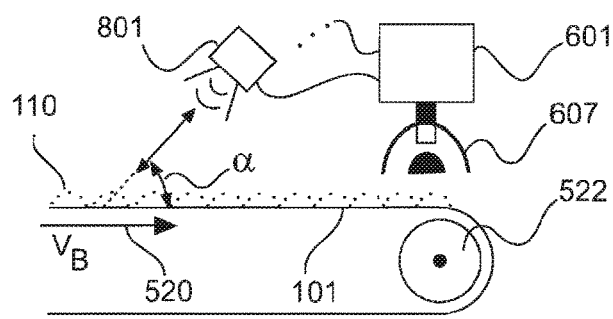

FIG. 8 shows a measuring apparatus for determining the speed of the conveying means according to an embodiment of the present invention.

Figure 9:
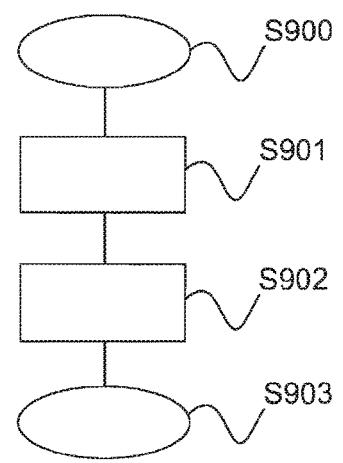

FIG. 9 shows a flow diagram of a method for detecting properties of an object according to an embodiment of the present invention.

DETAILED DESCRIPTION OF EMBODIMENTS

The depictions in the drawings are schematic and not to scale. In the following description of FIG. 1 to 9, the same reference signs are used for the same or equivalent elements.

FIG. 1 shows a conveying means 100, to give a better understanding of the present invention. The conveyor belt 101 shown, which is used as an object guidance means 101, moves an object 110 or medium 110, for example a bulk solid 110 such as gravel 110, from a source, for example from an object supply means 102 such as a hopper 102, to an object collecting means 111 at a destination 103, for example to a container 111. The conveying means 100 can comprise solely the object guidance means 101. The conveying means 100 can optionally also comprise the object supply means 102 and/or the object collecting means 111. The object guidance means 101 is designed to guide an object in a definable direction. The object 110 lies on a reference plane 131, which in FIG. 1 is formed by the belt of the conveyor belt 101.

In order to get from the source to the destination, the object 110 may move itself inside the object guidance means 101 or be actively moved by the object guidance means 101. The direction of movement is indicated by arrows in FIG. 1. As a result of the direction change by the direction-changing roller 112 or wheel 112, the conveyor belt on the side on which the object 110 is lying moves in the direction of movement of the object 110, and on the opposite side moves in the opposite direction. The direction of movement of the object 110 points from the source to the destination. Moving backwards may be ruled out. The object 110 moves at a definable speed. The direction-changing roller 112 may be driven and produces the movement of the object guidance means 101. In other embodiments, however, the drive may also be achieved in a different manner.

FIG. 1*a* is a plan view of the conveying means 100 of FIG. 1, intended to give a better understanding of the present invention. To simplify the view, FIG. 1*a* does not show an object 110 being moved by the conveying means. At the source, the object 110 can fall through the slot 113 in the hopper 102 onto the object guidance means 101. The region on which an object 110 can be located is defined by the width B of the object guidance means 101. In order to delimit the width B, the object guidance means 101 can comprise borders, elevations or barriers (not shown in FIG. 1 or FIG. 1*a*), which essentially ensure that an object 110 is located inside the width B on the object guidance means 101. In FIGS. 1, 1a, the dimensions of the object guidance means 101 provide the delimiting, i.e. all the objects that lie outside the region B fall beside the object guidance means 101 and cannot be conveyed, and therefore the object guidance means provides lateral delimiting of the region on which an object can be moved. The lateral direction lies substantially at right angles to the direction of movement of the object guidance means 101. Hence the lateral direction runs at right angles to the arrow directions shown. The width B of the object guidance means 101 extends substantially in the lateral direction. FIG. 1a also shows a linear region 130 on the object guidance means 101, along which region an object (not shown in FIG. 1a) can be analysed. In particular, a rise in the surface of the object 110 along the linear region 130 above the reference plane 131 can be analysed, and the height profile can be provided.

The task may be presented of determining the mass and/or volume of the material moved by the conveyor 101, in particular by the object guidance means 101.

FIG. 2 shows a conveyor 100 or conveying means 100 having an integrated belt scale 204, to give a better understanding of the invention. The conveying means 100 comprises the object guidance means 101 and the two direction-changing rollers 112, 112a. The object guidance means 101 is rotatably mounted at a bearing point 202. At a second bearing point 203, a weighing scale 204 is used to continuously measure the force currently exerted by the weight of the object guidance means 101 and of the conveyed object 110. Using the geometric dimensions and the design data of the object guidance means 101, it is possible to determine the mass of the object 110 currently lying on the conveyor belt. If by means of a rotary encoder (not shown in FIG. 2), which is located in the direction-changing roller 112 or in the direction-changing roller 112a, the speed of the object guidance means 101 in the direction of movement 206 is also known, it is possible to determine the quantity of the object or the corresponding amount of material that is conveyed in a specified time period or in a specified unit of time by the conveyor 100 into a container 111. If the density of the material of the object 110 is additionally known, it is also possible to determine the volume conveyed in a time period of interest.

Using belt scales 204 to monitor conveyor systems can mean that operational oscillations or vibrations inside the conveyor system 100 produce errors in the measurement result. In addition, the measuring equipment 204 must be incorporated directly in the design of existing conveying means 100, making it difficult to retrofit to existing conveyor systems 100.

FIG. 3 shows a conveying means 100 having a radiometric sensor 301, 304, to give a better understanding of the present invention. Radiation from a radioactive compound 301 passes through the object 110 being moved by the conveying means 100. A detector 304 arranged underneath the object 110 determines the absorption of the already known output intensity of the radioactive radiation 305, which is a measure of the thickness or of the absorption coefficients of the medium present between the radiation source and the detector. The measurement is not affected by vibrations of the conveying means, and likewise provides the volume conveyed in a unit of time when the density and composition of the material are known and the speed of the conveyor belt is additionally detected. The measurement using a radioactive compound, however, requires increased care to avoid endangering humans and the environment from the radioactive radiation. Therefore there must be a high expenditure on suitable safety precautions, making this method expensive. In addition, variations in the composition of the object can result in measurement errors, which can only be corrected with difficulty.

FIG. 4a shows a front view of a conveying means 100 having a sensor 401, 402 for determining a surface structure of an object 110 by means of laser radiation, intended to give a better understanding of the present invention. FIG. 4b shows a side view in the direction labelled by the letters A in FIG. 4a of a conveying means 100 having a sensor 401, 402 for determining a surface structure of an object by means of laser radiation, intended to give a better understanding of the present invention. Laser beams are used to sample the surface of the conveyed medium 110 or of the conveyed object 110 at different points 405, 406, 407, with the particular distance from the measuring instrument 401 to the surface 405, 406, 407 being determined at each point. By measuring the surfaces at different points, the measuring instrument 401 is able to determine the profile of the surface, and when the speed of the conveyor system is additionally detected, to calculate the conveyed volume. In order to determine a linear profile of the surface in the lateral direction, the laser beam is steered at right angles to the direction of movement of the object guidance means 101. The direction of movement of the object guidance means 101 is shown in FIGS. 4a and 4b by the arrows 410 and corresponds to the direction of movement of the object 110 on the side facing the sensor 401, 402.

When the density of the object 110 is known, the conveyed mass of the object 110 can also be calculated. The measurement can be affected by dust, however, which can attenuate or even deflect the propagation of the laser light 404. Furthermore, in the measurement arrangement shown in FIGS. 4a and 4b, a mechanical change to the radiation direction is produced by a mechanically moved component 402, which can result in corresponding wear.

FIG. 5a is a front view of a conveying means 100 having a sensor 500 for determining a surface structure of an object 110 by means of radar beams according to an embodiment of the present invention. FIG. 5b is a side view in the direction labelled by the letters C in FIG. 5a of a conveying means 100 having a sensor 500 for determining a surface structure of an object 110 by means of radar beams according to an embodiment of the present invention. Owing to the use of radar beams, the measurement is substantially unaffected by dust.

The measuring apparatus 530 comprises the sensor 500 and the conveying means 100. The conveying means 100 comprises the object guidance means 101 and the direction-changing roller 522 or wheel 522. In addition, the conveying means 100 can comprise a hopper 102 and a container 111 (not shown in FIG. 5a, 5b). The speed of the object 110 guided by the object guidance means 101 equals the speed of the object guidance means 101 on the side facing the sensor 500. The measuring apparatus 530 can comprise just the sensor 500, and can be operated independently of the object guidance means. It is also possible, however, for the sensor 500 to be fixed to the object guidance means 101.

A radar transmit beam is generated by a single transmitter 502 or by at least two transmitters 502. (The transmit beam is not shown in FIGS. 5a and 5b). The radar transmit beam propagates according to the antenna radiation pattern towards the object guidance means 101, and is reflected at the surface of the object 110. At points at which there is no object present, the radar beam is reflected by the object guidance means, in particular by the reference plane 131. Without loss of generality, the object 110 shall be assumed to be a bulk solid 110 for the description of the embodiments. The bulk solid can have across the width B in the lateral direction the undulating surface structure shown by way of example in FIG. 5a. In addition, the bulk solid can have in the direction of movement the undulating surface structure shown by way of example in FIG. 5b, where the surface structure in the direction of movement may differ from the surface structure in the lateral direction. Furthermore, without loss of generality, the object guidance means 101 shall be assumed to be a conveyor belt in the description of the embodiments.

The measuring arrangement shown in FIG. 5a comprises the control device 501. The control device 501 can control the transmitter 502, in which a radar beam is generated in accordance with the radar principle. This radar beam has a frequency of 79 GHz, for example, corresponding to a wavelength of 3.8 mm. The radar beam can be generated continuously, in pulsed form or according to the FMCW principle. FIG. 5a shows just one first transmitter 502. The sensor 500 can also comprise at least two or a multiplicity of transmitters 502, however. If the sensor 500 comprises at least two transmitters 502, it is possible to control the main beam direction of the transmit signal. Hence it may also be possible to control the antenna radiation pattern in the transmit direction. A substantially point-source or isotropic radiation pattern, which results in a substantially rectangular or oval footprint, shall be assumed, however, for the description of FIG. 5a, 5b, 5c, without loss of generality.

The transmitter 502 or the transmit unit 502 transmits a radar signal as the transmit signal towards the medium 110 to be monitored or the object 110 to be monitored, the properties of which are meant to be determined. (The transmit signal is not shown in FIG. 5a). The orientation of the antenna radiation pattern of the transmitter 520 towards the medium to be monitored is constant over time during transmission and exposes the conveyor 100 substantially over the full width B of the object guidance means 101 in the lateral direction and over the length L in the direction of movement. The exposed region 560 or footprint 560 produced by the transmit signal is shown in FIG. 5c in a plan view.

The main beam direction of the antenna radiation pattern is directed substantially perpendicularly to the transmitter 502 towards the object 110. The footprint produced depends on the antenna radiation pattern.

As a result of exposing the surface of the medium 110 to the transmit signal, the signal is reflected by the surface of the medium or by the exposed regions 533, 531 of the conveyor.

These receive signals 510 from the different points 533, 507, 508, 509, 531 are each received by each of the at least two receivers 505 at a different angle and hence are phase-shifted with respect to one another.

Likewise in the direction of movement of the object 110, a receive signal is reflected from the different points 511, 512, 513. Again these receive signals 551, 552, 553 are each received by each of the at least two receivers 505 at a different angle and hence received with a Doppler shift corresponding to the angle to the receiver in the direction of movement.

The receive signals 533, 507, 508, 509, 531, 551, 552, 553 are all produced by the same transmit signal. Thus the medium 110 reflects in the lateral direction the signals 510, which are received by at least two receivers 505. The at least two receivers 505 are arranged linearly along a line parallel to a rotational axis 521 of the direction-changing roller 522 of the object guidance means 101. The receivers 505 or the receive units 505 are here preferably spaced at a distance d, which is less than half the wavelength $\lambda$ of the radar signal, i.e. $d<\lambda/2$. If the measurement is restricted to the width of the object guidance means, the spacing of the receivers may also be greater than $\lambda/2$ according to the required unambiguous measurement range. The unambiguous measurement range may define here the angle range in which the calculated receive signal can be uniquely assigned to an angle, i.e. no ambiguities arise.

The distance of the transmitter from the receivers may equal the mutual spacing of the transmitters. Other spacing values are also possible, however.

By selecting said mutual equidistant spacing $d \leq \lambda/2$ of the receivers 505 in the array 504, it is possible to avoid ambiguities in the angle range $\pm 90°$ that would arise for spacings $d \geq \lambda/2$. It may also be possible, however, to distribute the receivers at non-equidistant spacings along a line.

The transmitter 502 and the at least two receivers 505 are shown as separate devices in FIG. 5a. It is also possible, however, that the transmitter 502 is used as a receiver as well. The electrical switching of the transceiver is in this case designed to implement a parallel transmit/receive mode. At least two receivers are needed for linear sampling, which is why an array 504 of transceivers comprises at least two transceivers.

The linear arrangement of the receivers 505 means that the receivers 505 form a linear one-dimensional antenna array 504. The transmitter 502 can also be positioned in the line. By this arrangement, the receivers receive the radar signal, which is reflected at least in part, from the different angle directions after a certain signal transit time and hence with a phase shift that corresponds to the distance to the object surface.

Mathematical algorithms can be used to convert the receive signal 510 into a plurality of receive signals having a plurality of receive beam directions. FIG. 5a shows such a receive signal 510 having by way of example 3 lobes or 3 receive directions. The use of mathematical algorithms to obtain receive signals in different receive directions is called digital beamforming. Each of the receive signals may belong to a sample area.

The receivers 505 and the single transmitter 502 or the at least two transmitters 502 are located substantially on a common plane, so that they are directed substantially vertically onto the object guidance means. The width of the antenna array 504, in particular the mutual spacing of the receivers 505, can be adjusted according to the required spatial resolution. The width of the array 504 need not equal the width B of the object guidance means 101. The width of the antenna array 504 can be less than, greater than or equal to the width B of the object guidance means 101.

Both the transmitter 502 and the receiver 505 are connected to the control device 501, and each is controlled by the control device 501. The control device 501 together with the transmitter 502 and/or the at least two receivers 505 forms a sensor 500 or a field device 500. The measuring apparatus 530 comprises the sensor 500 and optionally the object guidance means 101.

The sensor 500 can have a separate analysis device (not shown in FIG. 5a or 5b), which processes the signals received by the receivers 502. Sensor and analysis device can be connected via a two-wire line. The analysis device can determine from the received signals the distance of the sensor 500 from the medium 110 or from the object 110 at different points 533, 507, 508, 509, 531 of the object guidance means 101. The signals from the different points 533, 507, 508, 509, 531 involve different receive directions, which can be reconstructed from the receive signals, which are each received by the at least two receivers 505, by digital beamforming in postprocessing. The distance to the different points can be determined from the calculated signal transit times of the receive radar beam 510 to the particular point 533, 507, 508, 509, 531 being considered at the associated receive beam angle. In the lateral direction, digital beamforming is used to achieve a definable resolution for sampling the linear region.

The analysis device can be integrated in the sensor 500. Alternatively, the control device 501 can perform the function of an analysis device. The analysis device, however, can also be arranged outside the sensor 500, thereby allowing the power consumption for calculations to be reduced inside the sensor. Thus, for instance, when the sensor 500 or the field device 500 is in the form of a two-wire device, the power can be supplied via the same lines that are also used to provide measured values or to parameterise the measuring apparatus, i.e. to set parameters in the measuring apparatus for a measurement.

It is assumed below that the control device 501 performs the function of the analysis device and is integrated in the sensor 500. The control device 501, by analysing the transit times of the radar signals 510, 551, 552, 553 reflected at the surface of the object 110, is able to determine the profile of the surface of the object 110. The control device 501 can also detect and/or control the speed of the object conveying means 101 and/or the speed of an object 110 moving inside the object conveying means 101. The speed can be taken into account to calculate the volume of the object 110 conveyed per unit of time by the object guidance means 101. The total volume conveyed in a time period under consideration can be calculated from the volume conveyed per unit of time. When the density is known, the conveyed mass can also be calculated. These obtained parameters can be used, for example, to determine when a permitted load for a container 111 (not shown in FIG. 5a, FIG. 5b) is reached and the object guidance means 101 can be switched off.

FIG. 5a shows example points 507, 508, 509, 533, 531 on the undulating surface structure of the object 110. These points 507, 508, 509, 533, 531 run in the lateral direction along a linear region of the object guidance means 101 and can correspond to sample areas or sample points. The distance of the sensor 500, in particular of the receiver 505 and/or the transmitter 502, from the surface of the object 110 at different points 507, 508, 509, 533, 531 is determined by changing the receive direction of the receive radar signal 510 by digital beamforming in the receiver 505, in particular in the control device 501, once the transmitter 502 has first exposed the conveying means over the full width B to a radar signal.

The antenna radiation pattern of the transmitter 502, however, means that the antenna array 504 also detects components from the directions 551, 552, 553 in the direction of movement of the object. These components can be analysed using SAR (Synthetic Aperture Radar) algorithms and thereby located explicitly by analysing the frequency shift of the receive signals, which owing to different relative speeds with respect to the sensor unit 500 experience different frequency shifts because of the Doppler effect. The region 552' of interest can be focused in the direction of movement by using the SAR algorithms.

The change in the receive direction involves the at least two receivers 505. To change the receive direction, the measuring instrument 500, the field device 500 or the sensor 500 uses the principle of digital beamforming, which is performed in the sensor 500 using the signals received by the individual receivers 505 by offsetting and combining the individual signals. To perform beamforming of the receive signals, which are received by the receivers from a wide angle range, a phase shift appropriate to the lateral position of the receive signals and to the required receive direction is applied mathematically to said receive signals, and the resultant signals combined with one another. Applying a phase shift means that signals received by different receivers 505 are offset with respect to one another by a phase value corresponding to the mutual spacing of the receivers, and the offset signals are combined with one another. Beamforming can also be used in the lateral direction to generate sharply focused echo signals from any receive directions. These sharply focused receive signals can lie along the linear region and form small sample areas 508, 512. This measure can be used to determine the profile of the surface of the object 110 at different points 533, 507, 508, 509, 531 of the object guidance means 101.

In particular, a receive angle can be specified. Different receive signals at different computer-generated receive directions are indicated in FIG. 5a by the different lobes of the receive/transmit signal 510. In this case, the transmitter 502 is in the form of an isotropic radiator by way of example, and simultaneously exposes an area 560 that is larger than the linear region 552'. The exposed area 560 or the footprint 560 has the width B of the object guidance means 101 and the length L, and hence the area B×L on the conveyor 101. FIG. 5c shows an example of a footprint 560.

The receive beams 510 are therefore steered not by a mechanical beam-steering component but by changing the main receive direction of the array 504, i.e. by digital beamforming using the echo curves of the at least two receivers 505. Since all the receivers 505 receive the echo of the transmit signal, which echo comes from the surface of the bulk solid, simultaneously except for a certain transit-time offset arising from the different distance of the points 507, 508, 509, 533, 531, 511, 512, 513 to the receiver 505, the data is captured simultaneously or in parallel for the different receive beam directions. Hence just one transmit signal is needed per measurement interval and/or per time slice.

In other words, because of the antenna radiation pattern, the transmit signal 510 has a rectangular or oval footprint 560 on the object conveying means 101 and/or on the object 110. This footprint is exposed simultaneously by the single transmission of the transmit signal.

FIG. 5c shows a detail of a plan view of a conveying means shown in FIG. 5a, 5b, and shows the footprint 560 captured by means of the transmitter 502 and the at least two receivers 505 according to an embodiment of the present invention. In FIG. 5c, the lateral direction is denoted by x and the direction of movement by y. FIG. 5c shows in particular a plan view of the exposed region 560 of dimensions L×B. To make the diagram simpler, the footprint in FIG. 5c is shown as a rectangle without loss of generality. A linear region is sampled at a resolution of the width B1 in the lateral direction by means of digital beamforming, and at a resolution L1 in the direction of movement of the object 110 by using the SAR algorithm.

The footprint 560 comprises substantially a region of width B and length L, as shown in FIG. 5c, and hence for example in the lateral direction corresponds to a length B, which extends from the point 533 to the point 531, and in the direction of movement to a length L, which extends from the point 511 to the point 513. All the reflections from the footprint 560 are received simultaneously by the at least two receivers 505 of the antenna array 504 with different transit times and/or with different phases and/or different Doppler shift. A linear region 552' can be generated from the footprint 560 or from the entire exposed region 560 by means of digital beamforming and/or by means of focusing. In order to generate the linear region 552', in one example, signals that do not originate from the region 552' may be offset and combined using the SAR algorithm with echo curves that were received earlier or later. By focusing the transmit signal and/or the receive signal by means of physical beamforming and/or by using the SAR technique, the length L can be narrowed to the line width L1. This measure can be used to achieve a high resolution in the direction of movement.

Beamforming of the receive signal 510 can be used to partition the linear region 552' into areas of width B1 by sampling at different points 533, 507, 508, 509, 531. These sample areas of width B1 and length L1 combine to give the linear region 552' of width L1 and length B. FIG. 5c shows the point 508, 512 as an example of a sample area that lies substantially vertically below the sensor 500 both in the direction of movement and in the lateral direction. The total linear region 552' is located substantially vertically below the receive signal labelled 512, which has a vertical receive direction, i.e. substantially vertically below the linear array 504.

It is possible to increase the lateral resolution of the sensor 500 by increasing the number of receivers 505 and/or the number of transmitters 502 of the one-dimensional linear array 504 in one direction, for instance along a line or straight line, because increasing the number of receivers, for the receive case, can be used to improve the antenna radiation pattern achievable by digital beamforming. The lateral resolution of the sensor 500 may refer to the resolution in the direction lying parallel to the rotational axis 521 of the conveyor-belt drive. In particular, the resolution may be understood to mean the smallest possible, physically practical minimum difference in the receive angle between two points 507, 508, 509, 533, 531, 511, 512, 513. The lateral angular resolution $\theta_{DSF}$ is here determined according to the Rayleigh criterion solely by the maximum total lateral extent $D_l$ of all the receivers 505, i.e. of the array length, and the wavelength $\lambda$ used, and is given by $\theta_{DSF}=\lambda/D_l$, measured in radians.

The smallest possible resolvable distance on the object guidance means 101 vertically below the centre of the extent $D_l$ is hence given by:

$B1=2*D_F*\tan(\lambda/(2*D_l))$, where $D_F$ is the distance between the reference plane 131 and the plane in which the receiver 505 and/or the transmitter 502 is arranged.

In other words, by increasing the number of receivers 505 and/or the number of transmitters 502 for constant spacing d between the receivers 505 it may be possible to detect the structure of the object 110 at numerous points 507, 508, 509, 533, 531 lying close together along a line 552' in the lateral direction and hence produce in the sensor 500 a higher-resolution image of the structure of the object 110.

The direction of movement 520 of the object 110, or the movement of the mass flow 110, is substantially at right angles to the lateral direction x. The direction of movement of the object 110 is the same as the direction of movement 520 of the object guidance means on the side of the object guidance means 101 facing the sensor 500. On a side facing away from the sensor, the direction of movement 520 of the object guidance means 101 runs opposite to the direction of movement of the object 110.

In the direction of movement 520 of the object 110, the antenna array 504 has a wide transmit radiation pattern and/or receive radiation pattern. The transmit radiation pattern and/or receive radiation pattern corresponds substantially to the length L. Additional computing techniques can be used to obtain a receive radiation pattern L1 that is as narrow as possible, and hence linear, also in the direction of movement of the object 110. These additional computing techniques can be used to determine effectively the distance to a point to 511, 512, 513 in the direction of movement 520 of the surface of the object 110. In other words, it may be of interest to determine the structure or topology of the surface of the object 110 along as narrow a line as possible of width L in the lateral direction below the array 504. It would be desirable, for example, to obtain only the reflection from the substantially vertical signal 512 along the linear array 504 without receiving the echo components 511, 513. For this purpose, the aim is to minimise the sampled region, which extends, for example, from the point 511 to the point 513 and has the dimension L.

In other words, the aim may be to achieve a narrow and substantially punctiform sampling signal both in the lateral direction and in the direction of movement in order to be able to sample the structure of the surface of the object as exactly as possible. The received reflection components, which come from the points 511, 513 lying outside the laterally arranged line 512, are meant to be blanked out. The technique based on SAR (Synthetic Aperture Radar) algorithms is used to analyse the receive signal in the direction of movement by analysing the Doppler shift of the receive signals 511, 512, 513, which is produced both in the direction of the point 511, corresponding to a positive Doppler frequency, and in the direction of the point 513, corresponding to a negative Doppler frequency, by movement of the object. Echo components that lie directly opposite the linearly arranged antenna array 504 experience substantially no Doppler shift. In other words, this may mean that echo components that come from regions lying vertically opposite the antenna array experience substantially no Doppler shift. For the SAR technique, the control device 501 analyses the region of the footprint 560 of size L×B, which is detected simultaneously by the receivers 505.

When using the SAR technique, the achievable angular resolution along the direction of movement is given by $\theta_{SAR}=\lambda/L$ (in radians). In order to achieve the maximum possible resolution at the position 512 of the object, i.e. in order to achieve as narrow a line as possible, it is hence necessary to use and analyse the continuously captured measurement data from the time window $\Delta t=L/v_B$, where $v_B$ is the speed of the object guidance means 101. The smallest possible resolvable distance on the object guidance means 101 vertically below the centre of the extent $D_l$ is hence given by $L1=2*D_F*\tan(\lambda/(2*L))$. In order to achieve a good coverage, a time slice of the surface structure is determined in the lateral direction in a time interval of $t_1=L1/v_B$. A larger time interval can also be implemented, however.

In other words, this means that L defines the length of the coverage region without focusing measures and L1 defines the length of the coverage region using focusing measures. Focusing in the direction of movement 520 or in the conveying direction 520 of the object 110 can be achieved by offsetting and combining with already captured echo signals or echo signals still to be captured from the points 511, 513 lying before and after the line in the direction of movement. Focused linear sampling of the region 552' can hence be performed.

The radar distance measuring technique can include the analysis of a pulse-shaped radar signal or an FMCW radar signal. A pulse-shaped radar signal is amplitude modulated whereas an FMCW radar signal is frequency modulated.

Since the surface of the object 110 is detected using a plurality of receivers 505 working in parallel in time and by subsequent digital beamforming, it is possible to achieve a very high measurement repetition rate. In comparison, mechanically steered systems, or systems that work using analogue beamforming and hence must sample in series the region to be detected, must perform a multiplicity of separate measurements in the same time period. Since existing standards rule out shortening the measurement time of a single radar measurement to any length required, these systems cannot have the measurement repetition rate needed for detecting conveyor belts. The beamforming of the transmit signal and the beamforming of the receive signal may be interpreted as steering.

FIG. 6a shows a front view of a conveying means 100 having a further sensor 600 for determining a surface structure of an object 110 by means of radar beams according to an embodiment of the present invention. FIG. 6b shows a side view in the direction labelled by the letters D in FIG. 6a of a conveying means 100 having a further sensor 600 for determining a surface structure of an object by means of radar beams according to an embodiment of the present invention. The further sensor 600 is a sensor that uses physical beamforming in the direction of movement to achieve physical focusing in the direction of movement. The further sensor 600 is substantially the same as the sensor in FIGS. 5a and 5b, but comprises in addition to the antenna array 604 a parabolic trough 607, which can be used to achieve beam focusing in the direction of movement 520 of the object 110. By virtue of this physical focusing, the analysis of the Doppler effect using the SAR algorithm may be dispensed with.

The parabolic sensor 600 comprises the control device 601 and the one-dimensional antenna array 604, which comprises at least one single transmitter 502 and at least two receivers 505. The antenna array 604 can have the same construction as the antenna array 504. The one-dimensional antenna array 604 has a linear design, the transmitter 502 being arranged at a centroid of the line, and the receivers 505 being arranged in a line about the transmitters 502. Any other arrangements are possible.

The receive signals 610, 605, 606 of the receivers 505, like the receive signal 510 described in FIGS. 5a and 5b, are used for digital beamforming in the lateral direction. Focusing of the signals along the conveying direction is not performed algorithmically using the SAR algorithm as in the embodiment shown in FIGS. 5a and 5b, but by using suitable hardware components.

The one-dimensional antenna array 604 is arranged inside a parabolic trough 607 by way of example. The antenna array 604 is arranged at a focal point of the parabolic trough 607. The parabolic trough 607 has a concave shape, the aperture of which is directed towards the object guidance means 101. In order to enhance the directivity, the parabolic trough 607 can be embodied as a Cassegrain antenna 620. A Cassegrain antenna 620 comprises in addition to the parabolic trough 607 a hyperbolic secondary reflector 608, which interacts with the parabolic trough 607 to focus along the direction of movement 520 of the conveyor 100 transmit signals and also the receive signals 610, 605, 606, which receive signals are focused by digital beamforming in the lateral direction. By virtue of this focusing, the transmit signal and the receive signals 610, 605, 606 expand only as far as the length L2 and produce a correspondingly narrow linear footprint 560' across the width B and the length L2 of the object guidance means 101. The linear footprint 560' extends parallel to the rotational axis 521 of the direction-changing roller 522 of the object guidance means 101. The principle of reciprocity applies to the parabolic trough 607 because it is an antenna, i.e. it can be used both to transmit and to receive with the same characteristics.

The measuring apparatus 630 comprises the sensor 600 having Cassegrain parabolic trough 620 and the object guidance means 101. The measuring apparatus 630 can comprise just the sensor 600, and can be operated independently of the object guidance means.

Other antenna designs for focusing the radar waves can also be used apart from the Cassegrain parabolic trough 620. The mechanical focusing can alternatively be achieved, for example, using lens arrangements or two-dimensional patch antennas, which are permanently wired to one another in rows along the direction of movement of the conveyor 520 in order thereby to achieve directivity by means of the fixed phase offset between the patches or transmitters 502 in a row.

The array 504, i.e. the array 504 without physical focusing means, is a one-dimensional arrangement, however, without focusing in the direction of movement 520 of the object 110. Therefore, the SAR algorithm is used to achieve the focusing. Although the SAR algorithm is not needed in the physically focused arrangement of the array 604 employing parabolic trough 607 as shown in FIG. 6a, it can be used to assist the focusing.

FIG. 6c shows for illustrative purposes a plan view of the sampled region of dimensions L2×B. A resolution of width B2 in the lateral direction is achieved by digital beamforming, and a resolution L2 is achieved by using physical focusing means. In addition, FIG. 6c shows the footprint 560' captured by the transmitter and receiver, which footprint substantially corresponds to the linear region 552" because of the physical focusing means used.

The width B2 is sampled using substantially the same technology of digital beamforming as is used for the width B1. The length L2 depends on the physical properties of the parabolic antenna, in particular on how these physical properties affect the beam path of the transmit signal and/or of the receive signal.

In FIG. 5c, the length L1 is achieved by mathematical calculations. Whereas in FIG. 5c the reflected signal from the area 560 of dimensions B×L is received per measurement time interval $\Delta t$, in FIG. 6c the reflected signal from the area 560' of dimensions B×L2 is received per measurement time interval $\Delta t1$.

Since the sample area L1×B1 of the linear region 552' of FIG. 5c and the sample area L2×B2 of the linear region 552" of FIG. 6c are square or rectangular areas or planar regions of the linear region 552' and 552", the volume of the object 110 is approximated by the volume of columns of relevant heights. The smaller the sample areas 508, 512 can be made, the more exactly the volume of the linear region can be determined.

Errors in the measurement results can arise if vibrations in the reference plane 131 of the conveyor 101 or in the mounting point of the sensor 500, 600 occur independently of each other and hence the distance between the reference plane and the mounting point of the sensor varies. In order to avoid errors from vibrations, the measurement can incorporate a distance to a point known in advance. For example, an additional distance measurement 614 can be included in the receive beamforming.

With reference to FIG. 5a, 5b, 6a, 6b it should be mentioned that although these figures show a combination of sensor 500, 600 and object guidance means 101, the sensors 500, 600 can also be made, supplied and operated without the object guidance means 101. The adjustable angle range for the receive direction can be set, however, such that the sensor can be operated with any object guidance means 101. The width of the particular object guidance means being used, however, can affect the definable angle range of the receive directions. The control device 501, 601 can define accordingly the angle range of the receive directions.

FIG. 7 shows a measuring apparatus 630 having a marker 701 or marker device 701 according to an embodiment of the present invention. Although FIG. 7 shows a measuring arrangement having the Cassegrain parabolic trough 620 of FIG. 6a, 6b, 6c, it is also possible to use the marker 701 for an arrangement as shown in FIG. 5a, 5b, 5c. The marker 701 is in the form of a reference reflection point 701 comprising a reflective body 702 and a retaining device 703. The reference reflection point 701 is well suited to reflecting radar beams, in particular radar beams in the frequency range used. The retaining device 703 is designed to maintain a fixed distance between the rotational axis 521 of the direction-changing roller 522 and the reflective body 702 in the event of vibrations. The retaining device may ensure that the surface of the reflective body 702 lies substantially at the same height as the surface of the object guidance means 101 on which the object 110 is lying or on which the object 110 is moving. The surface of the reflective body 702 may have a planar design, and the surface 704 of the reflective body 702 may be located in the same plane 131 as the surface of the object guidance means 110 facing the sensor 630.

In FIG. 7, the object guidance means 110 is in the form of a conveyor belt 110. The reference reflection point 701 or the marker 701 is incorporated in the surface measurement by the sensors 500, 600. For this purpose, the surface sampling is extended beyond the lateral width B to the width B3, with the result that the marker 701 is captured too by the transmit signal 614, 610, 605, 606 and also contributes to the reflected signal. Since the position of the marker is known, the reference distance of the marker from the sensor 600 is also known. If the position of the object guidance means 101 moves, for example as a result of vibrations, the position of the marker 701 also moves by the same amount. This movement is registered by the receive signal 614. If the actual distance of the marker 701 is measured, the currently measured actual distance of the surface of the object 110 can be used to correct for vibration effects, assuming the object 110 moves with the object guidance means 101 and the surface structure does not change substantially as a result of the vibrations. In other words, the marker 701 can be used to correct the current position of the reference plane 131 for the object 110 so that the volume and/or mass of the object 110 can be calculated substantially free of vibrations. The marker apparatus 701 ensures that the surface 704 of the reflective body 702 lies in the same plane as the reference plane 131 of the object guidance means 101. The reflective body 702 is kept substantially uncovered by the object 110, for example because it lies outside the boundary of the width B.

The speed $v_B$ of the object guidance means 101 in the direction of movement 520 can be detected using rotary encoders (not shown in FIGS. 5a, 5b, 6a, 6b, 7), which are used as a speed measuring apparatus and measure the angular velocity of the direction-changing roller 522. The measured speed can be used to determine the mass flow and/or volume flow of the object 110 per unit of time. A rotary encoder can be mounted on the rotational axis 521 for example.

FIG. 8 shows a speed measuring apparatus 801 for contactless measurement of the speed of the object 110 according to an embodiment of the present invention. The speed measuring apparatus 801 is connected to the control device 601 and provides its results to the control device 601. Although in FIG. 8 the speed measuring apparatus 801 is shown in combination with the control device 601 of FIG. 6a, 6b, it can be combined with every other control device 501, 601. A contactless speed measuring apparatus can be used in addition to the use of a rotary encoder or without a rotary encoder and can detect the speed of the medium 110. Whereas only an indirect measurement of the speed of the object 110 is possible using a rotary encoder, the speed measuring apparatus 801 can be used to measure the speed of the object 110 directly.

The speed measuring apparatus 801 can be implemented as an additional transmitter and receiver 801 in addition to the transmitter 502 and/or the at least two receivers 505. The speed measuring apparatus 801 can also be designed as an additional transceiver, which can both generate and receive a radar signal. Owing to the short signal transit times, however, because of the proximity to the object guidance means, transmitting and receiving may be substantially in parallel. In other words this may mean that the transmitter and the receiver are operated independently of one another.

In order to measure the object speed, the additional transmitter 801 or the additional receiver 801 may be mounted at a defined angle α to the direction of movement of the medium 110. In particular, the additional transmitter 801 or the additional receiver 801 may be arranged at a defined angle α to the surface of the object guidance means 101. Alternatively, the additional transmitter 801 or the additional receiver 801 may be arranged at a defined angle α to the surface of the marker 701 (not shown in FIG. 8).

If the transmitter of the speed measuring apparatus 801 transmits a radar signal, owing to the installation at the angle α, a Doppler shift that depends on the speed $v_B$ of the object 110 is produced in an associated receive signal received by a receiver in the speed measuring apparatus 801. The instantaneous speed $v_B$ of the object 110 can be determined in the control device 601 from this Doppler shift. Alternatively, the speed measuring apparatus 801 can also be implemented as an additional radar measuring instrument 801, which acts independently of the control device 501, 601 and transmits the instantaneous speed $v_B$ of the object 110 to the control device 601. The speed measuring apparatus 801 can also be integrated in the sensor 500, 600 in order to be able to provide a user with a compact, easy-to-install measuring system. For instance, a transmitter 502 and a receiver 505 can be configured to measure the speed. By suitable use of the technique explained in the description for FIG. 5b, for example, it is also possible to determine the speed from the receive signals 551, 552, 553 provided by the receive units 505 and available to the SAR algorithm. It may be possible to obtain the information about the speed when using the SAR algorithm.

The measuring apparatus 530, 630 can be designed as a component that can be retrofitted to an object guidance means 100, and can comprise the control device 501, 601, the sensor 500, 600 and optionally the speed measuring apparatus 801. FIG. 9 shows a flow diagram of a method for detecting properties of an object according to an embodiment of the present invention. Starting from the initial state S900, in the step S901 a transmit signal is transmitted by means of a transmitter, and a receive signal is received by means of at least two receivers. The receive signals are produced by the same transmit signal. Where mathematical focusing is used, a reflected signal from the area L×B, i.e. from the footprint 560, is received. Where physical focusing is used, the reflected signal from the area L2×B, i.e. from the linear region 552" or the footprint 560', is received.

In one example, the signal is transmitted and received in the same plane at a definable distance from an object guidance means, in particular above a surface of the object guidance means facing the transmitter and/or the receiver.

In one example, the transmit signal is designed to be transmitted with a period length $L1/v_B$ or $L2/v_B$, although it is not necessary to sample every region of the object surface to obtain a useful result.

In one example, the movement of the object is delimited, at least during transmission and reception of the signal, to a region inside a definable width B. The transmit signal and/or the receive signal is focused such that the definable width of the object guidance means is captured.

In the step S902, the structure of the object is analysed using the receive signals from the at least two receivers along a linear region within the width of the object guidance means by partitioning the width into smaller sample areas and analysing. The length of the line along which the analysis is performed may equal the width B of the object guidance means.

In the case of mathematical focusing, the lateral region B is composed from sample areas of width B1 by digital beamforming, and the SAR algorithm is used to focus onto the length L1.

In the case of physical focusing, the SAR algorithm can be dispensed with because a physically focused signal already exists and solely digital beamforming is used to compose the lateral region B from sample areas of width B2.

An obtained volume value, or a time slice having a surface topology, can be provided. Likewise, the accumulated surface structure over a definable time period can be provided. A configuration device can be used to set the form in which the measured values are provided.

The method ends in the step S903.

In addition, it should be mentioned that the terms "comprising" and "having" do not exclude any other elements or steps, and "a" or "an" does not rule out more than one. It should also be pointed out that features or steps that have been described with reference to one of the above embodiments can also be used in combination with other features or steps of other embodiments described above. Reference signs in the claims shall not be deemed to have a limiting effect.

The invention claimed is:

1. A radar apparatus for determining a topology of an object on an object guidance device, a volume of the object, or a mass of the object, comprising:
   an array antenna including a transmitter and at least two receivers;
   control circuitry;
   a measuring instrument interface; and
   a non-transitory computer-readable storage medium on which a program code is stored,
   wherein the transmitter and the at least two receivers are positioned on a line in a lateral direction across a width of the object guiding device, which is designed to guide the object in a longitudinal direction of the object guidance device,
   wherein the program code, when executed by the control circuitry, causes the control circuitry to be configured to:
   transmit a transmit signal from the transmitter,
   to receive, from the at least two receivers of the array antenna, receive signals which are produced by the transmit signal,
   use the receive signals from the at least two receivers of the array antenna to analyse the structure of the object along a linear region in the lateral direction across the width of the object guidance device using digital beamforming, such that a topology of a surface of the object along the line in the lateral direction of the object guidance device is determined by the at least two receivers,
   determine a topology of the object, a volume of the object, or a mass of the object, and
   output the topology, the volume, or the mass.

2. The measuring apparatus according to claim 1, wherein the transmitter and the at least two receivers are arranged in the same plane at a definable distance from the object guidance device.

3. The measuring apparatus according to claim 1, wherein the transmitter and/or the at least two receivers are arranged in a line.

4. The measuring apparatus according to claim 1, wherein the object guidance device is configured to restrict a movement of the objec to a region inside the width of the object guidance device.

5. The measuring apparatus according to claim 4, wherein the at least two receivers and the transmitter are arranged inside the region of the width of the object guidance device.

6. The measuring apparatus according to claim 4, wherein the object guidance device comprises a marker device configured to define a reference plane.

7. The measuring apparatus according to claim 4, wherein the object guidance device is a mechanism selected from a group of mechanisms that consists of:
   a conveyor belt;
   a vibrating device; and
   a roadway.

8. The measuring apparatus according to claim 1, wherein a main receive direction of the receivers is changeable.

9. The measuring apparatus according to claim 8, wherein a digital beamforming method is used to change the main receive direction of the receivers.

10. The measuring apparatus according to claim 1, further comprising:
    a speed measuring apparatus,
    wherein the speed measuring apparatus is configured to determine a speed of movement of the object.

11. The measuring apparatus according to claim 1, wherein the object is a bulk solid, a vehicle and/or a body.

12. The measuring apparatus according to claim 1, wherein the control circuitry is further configured to determine a topology of the object and to determine the volume and/or mass of the object from the topology.

13. The measuring apparatus according to claim 1, wherein the measuring apparatus is a two-wire system.

14. The measuring apparatus according to claim 1, wherein the transmitter and the at least two receivers are arranged in the same plane at a definable distance from the object guidance device,
    wherein the transmitter and/or the at least two receivers are arranged in a line, and
    wherein the object guidance device is configured to restrict a movement of the object to a region inside the width of the object guidance device.

15. A method for determining a topology of an object on an object guidance device, a volume of the object, or a mass of the object, comprising:
    transmitting a transmit signal from an array antenna including a transmitter and at least two receivers;

receiving, from the at least two receivers of the array antenna arranged on a line in a lateral direction across the width of the object guiding device, which is designed to guide the object in a longitudinal direction of the object guidance device, receive signals which are produced by the transmit signal; and analyzing the structure of the object using the receive signals from the at least two receivers of the array antenna along a linear region in the lateral direction across the width of the object guidance device using digital beamforming, such that a topology of a surface of the object along the line in the lateral direction of the object guidance device is determined by the at least two receivers;

determining a topology of the object, a volume of the object, or a mass of the object; and outputting the topology, the volume, or the mass.

16. A non-transitory computer readable medium having stored thereon a program that when executed by a computer causes the computer to implement the method according to claim 15.

17. The method according to claim 15, further comprising:

determining a topology of the object; and determining the volume and/or mass of the object from the topology.

* * * * *